United States Patent

[11] 3,600,101

| [72] | Inventors | Paul L. Oglesby<br>Moweaqua;<br>Richard E. Reeves, Decatur; William K. Haebich, Decatur, all of, Ill. |
|---|---|---|
| [21] | Appl. No. | 887,209 |
| [22] | Filed | Dec. 22, 1969 |
| [45] | Patented | Aug. 17, 1971 |
| [73] | Assignee | Decatur Pump Company<br>Decatur, Ill.<br>Continuation-in-part of application Ser. No. 785,556, Dec. 20, 1968. |

[54] COMPACT HIGH TEMPERATURE PUMP
10 Claims, 1 Drawing Fig.

[52] U.S. Cl. .................................................. 415/111,
 415/170, 415/175, 277/16
[51] Int. Cl. ........................................................ F01d 11/00,
 F16j 15/00
[50] Field of Search ........................................... 415/110,
 111, 112, 170, 172, 173, 175; 277/16, 22, 53, 56

[56] References Cited
UNITED STATES PATENTS
2,864,314 12/1958 Culleton ....................... 415/111

2,977,042 3/1961 Jassniker ....................... 415/206

FOREIGN PATENTS

| 114,725 | 10/1929 | Austria ........................ | 415/111 |
| 26,418 | 1908 | Great Britain ................ | 277/16 |
| 231,143 | 10/1925 | Great Britain ................ | 277/22 |
| 153,424 | 5/1938 | Austria ........................ | 277/22 |

Primary Examiner—Henry F. Raduazo
Attorney—Hill, Sherman, Meroni, Gross and Simpson ABSTRACT: A compact, inexpensive, high temperature pump includes a shaft seal cavity area separated from an impeller cavity area by a film-thin passageway whereby a small portion of a first high temperature fluid may flow from the impeller cavity to the seal cavity through the passageway. A press-fit throttle bushing having a recess in its outer surface is press-fit into a bore to provide a separate passageway for a second low temperature fluid. The throttle bushing or fluid jacket extends around the outside and in heat transfer relationship to the seal cavity and the passageway so that the portion of the first fluid is greatly cooled thereby allowing the use of conventional and inexpensive shaft seals for the high temperature pump.

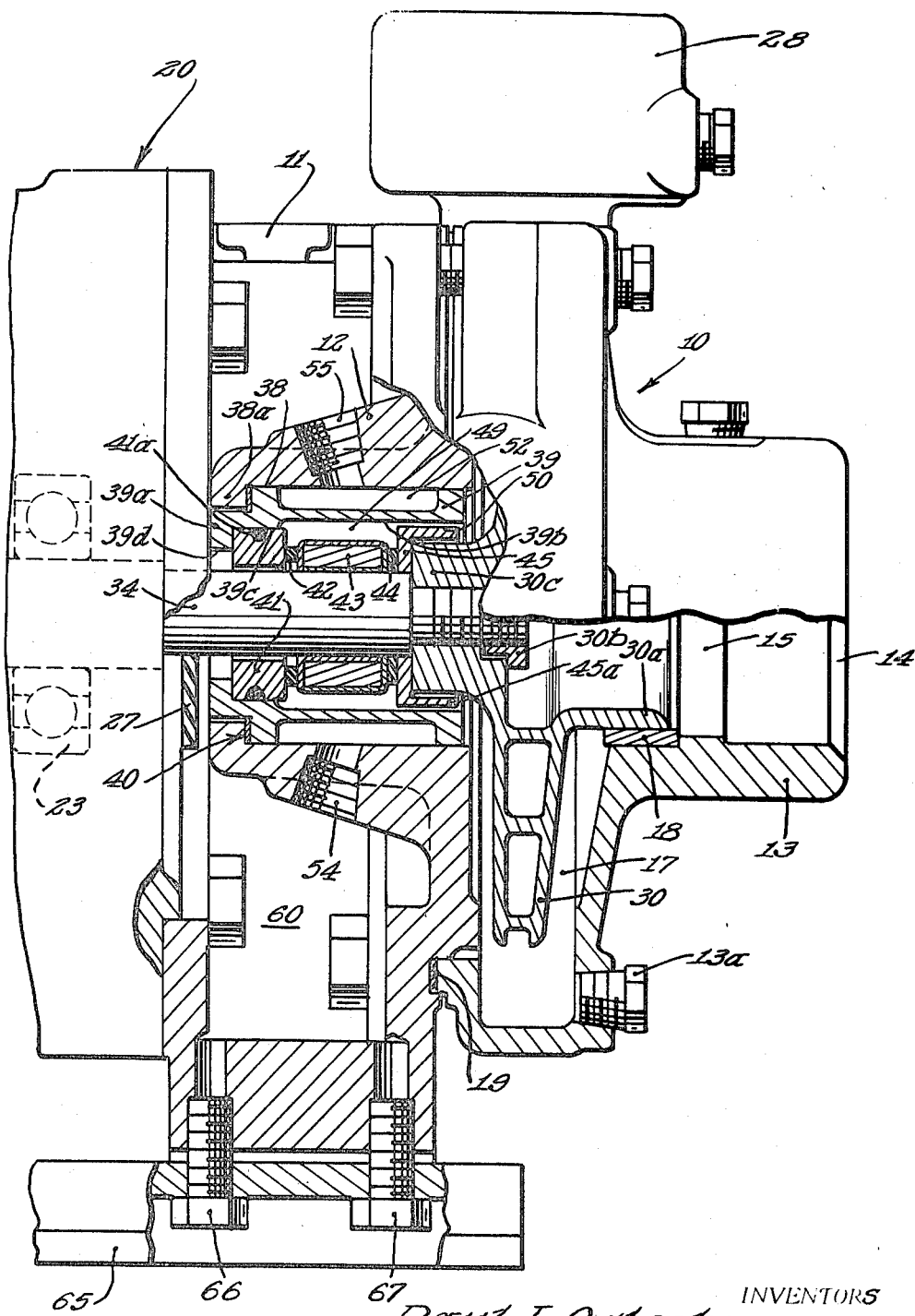

COMPACT HIGH TEMPERATURE PUMP

This invention generally relates to a pump construction for handling fluid of extreme temperatures and is a continuation-in-part application of our Application Ser. No. 785,556, filed on Dec. 20, 1968.

BACKGROUND OF THE INVENTION

1. Field of the Invention

More particularly this invention contemplates the design of both turbine and centrifugal type pumps having a jacketed seal cavity with a mechanical face seal therein designed for high temperature heat transfer fluid applications.

2. Description of the Prior Art

As set forth in our prior application it is known that pumps for high temperature fluids of 700° F. or more for example, have been manufactured, however, in each case they have required expensive and very special modifications. Thus, for example, where the shaft seal was located adjacent the impeller area an expensive and exotic shaft seal combination such as metal bellows costing up to $150.00 for a five-eighths inch shaft size were required to give reliable field service.

In other constructions of the prior art a large water jacket integrally formed with the pump frame required a large flow of cooling liquid to cool the shaft area. In addition to increasing the size and weight of the pump because of the tremendous area that was required to be cooled, the pumps were inefficient in that they tended to cool the fluid being pumped, and required a large volume of cooling fluid.

Moreover, the pump frame having an integrally formed jacket had a limited use only for pumps wherein a fluid of extreme temperature was to be handled. Other pumps having cooling jackets allowed intermixture of the cooling fluid and the fluid being pumped with the result that the cooling fluid had to be substantially the same as that being pumped.

SUMMARY OF THE INVENTION

By contrast with the prior art, the pump construction of the present invention is simple, inexpensive and readily adaptable to widely varying conditions of use and production. By placing our seal in an area of relatively cool or moderate temperatures a seal costing only a few dollars provides the same or better performance than the very expensive seals presently being used. Pumping costs thus are in the same range as standard pumps. A separable throttle bushing lends itself to flexible and convenient construction. It provides easy variance in the size of the cooling fluid cavity provided while also making it possible to entirely eliminate any cooling fluid cavity in the pump.

Being able to eliminate the cooling channel through mere change of the throttle bushing allows standardization in the production and use of the pump. The ability to quickly vary the size and shape of the cooling channel depending upon present and future design conditions has the advantage that a pump may be readily converted from one fluid to another. A single frame may be used for a wide variety of pump designs. These and other advantages will become readily apparent in our pump construction which basically comprises a surrounding frame, a shaft rotatably mounted in the frame, an impeller cavity area, a shaft seal cavity area, a communicating passage extending between the impeller cavity area and the shaft seal cavity area and a fluid jacket that is located in the vicinity of the communicating passage.

The fluid jacket or cooling channel in our high temperature pump is separate from the impeller cavity area, the seal cavity area and the communicating passageway. Thus, the fluid jacket has first fluid inlet and outlet means not in communication with the above noted cavity areas and may circulate a first fluid in and through said fluid jacket. The fluid in the impeller cavity area, the communicating passageway and the seal cavity area comes in through a second fluid inlet and leaves through a second fluid outlet means thereby allowing the circulation of a second fluid in said areas.

The communicating passageway is restricted so that only a small portion of the second fluid may pass to said shaft seal cavity whereby when the first fluid is cool and the second fluid is hot said small portion of the second fluid will be cooled as it circulates through said communicating passage and into said shaft seal cavity area. The result is that the small portion of the second fluid in the shaft seal area will be substantially cooler than the larger portion of the second fluid circulating in and through the impeller cavity area. These substantially cooler temperatures in the shaft seal cavity allow the use of a conventional and relatively inexpensive seal means. This seal means of course encircles the shaft in the shaft seal cavity area and presents the fluid being pumped from escaping.

We have also found that standard face type seals commonly used in low temperature pumps give excellent results. The exact type of shaft seal means that may be used may be that selected or recommended by the manufacturer to best suit a particular application.

The frame construction includes an internal shaft support portion having a bore. A throttle bushing having an outer surface and an inner surface is received in this bore with the outer surface of the throttle bushing conforming substantially to the bore. In addition, the outer surface of the bushing has a circumferentially oriented cavity which when enclosed by the bore forms a closed fluid tight channel. Inlet and outlet ports through the frame communicating with the fluid tight channel allow the channel to function as a fluid jacket. As will be further set out in the application, the communicating passage is of a cylindrical configuration and advantageously it is of great length with respect to its thickness. The communicating passageway is formed by the outer surface of a washer spacer and the inner bore of the throttle bushing and thus is positioned adjacent to the throttle bushing and more remote and insulated from the shaft.

A compact design in which the impeller is located very close to the motor bearings for minimum impeller overhang is achieved by enlarging the fluid cavity and moving it outwardly to surround a portion of the shaft seal cavity. The enlarged cooling cavity area makes possible an extremely efficient cooling system in a very small and compact space while continuing to allow the benefits of inexpensive shaft seals where previously very expensive and complex seals were required. It is also of course, a very important feature of this invention that maintenance and repair field service may be accomplished very rapidly thereby minimizing the very costly downtime of the pump and of the apparatus of which it is a part. Equally important of course, is that the design simplicity also makes possible its maintenance and repair by service men having a minimum of experience.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

The Figure is a cross-sectional view of an embodiment of the high temperature pump showing the relationship of the compact cooling cavity-seal construction to a driving motor bearing.

DESCRIPTION OF THE PREFERRED EMBODIMENT

Referring to the Figure there is shown a pump generally indicated at 10 attached to a conventional driving or motor means indicated at 20. The frame of the pump 10 comprises an external casting 11, and internal shaft support portion 12 and a front cover plate or casing portion 13. The particular form of the casting configuration may be cylindrical, however, any appropriate shape may be used. Likewise, the material from which the frame is fabricated should be suitable to the design factors of strength, size and the fluid to be handled. The cover plate or a casing portion 13 may conveniently include an inlet opening 14 that communicates through an inlet passageway 15 to an impeller 30 which impeller 30 rotates in an impeller cavity area 17.

An important feature of the present invention is that the structural member 13 commonly referred to as a casing serves to form the impeller cavity area 17 and also provides a bearing-sealing means 18 for the outer inlet end 30a of the impeller 30. The casing 13 is attached to the pump frame by suitable external means as will be known to those skilled in the art. A sealing means 19 advantageously is provided in the area of contact between the casing 13 and the pump frame portion 12 to provide a fluid tight seal for the impeller cavity area. From this advantageous arrangement of the pump, frame and casing elements it is apparent that assembly and disassembly of the pump is both simple and efficient. Thus, when the external holding means of the casing 13 are disconnected the casing 13 may be easily moved axially off the impeller portion 30a leaving the internal structure of the pump exposed. A further removal of the connecting means 30b holding the impeller on the main shaft portion 34 completely exposes the shaft seal construction for maintenance and repair. Thus, the removal of only two connecting means provides simplicity and rapidity in field service that together with the simplicity of construction of the shaft seal construction minimizes field service time and the consequent downtime of the pump.

The driving means 20 for the pump 10 may be of a conventional design and thus will include a ball bearing means 23 surrounding the shaft 34. A slinger washer 27 mounted on the shaft 34 adjacent the shaft seal propels any possible leakage or seepage through the pump seal radially away from the shaft and thus away from possible intrusion into the motor and particularly bearings 23. From the Figure it may be seen that the impeller 30 is located very close to the motor bearing 23 thereby providing for minimum impeller overhang which we have found will insure long bearing life. This compact design also of course makes the pump of our invention adaptable to a greater variety of uses and applications requiring minimum weight and size design structures.

The shaft support portion 12 of the frame has a bore 38 therethrough. This bore may take any shape, however, we have found it convenient to provide a cylindrical bore coaxial with the main shaft 34. Advantageously the bore 38 may include a retaining lip 38a about its rearward edge.

Seated within the bore 38 in press-fit-relationship thereto is a mating throttle bushing 39. An extension 39a of the throttle bushing 39 extends into the bore 38a, however, this need not be in press-fit-relationship. A seal means 40 between the lip portion 38a and the press-fitted throttle bushing 39 assures a fluid tight seal therebetween.

The throttle bushing 39 is configured such that it has a fluid cavity 52 formed therein. A shown, this cavity takes the form of a channel in the outer surface of the throttle bushing 39 and the enclosing surface is provided by the interior surface of the bore 38. This, of course, has but one embodiment and it is envisioned that this cavity may take other forms. A fluid inlet port 54 and a fluid outlet port 55 communicate with the cavity 52 to allow the circulation of fluid therethrough. The ports 54, 55 have threaded portions therein for receiving tubing or other conduits (not shown) that will convey fluids into and out of the fluid tight cavity and cooling fluid passageway 52. The throttle bushing 39 may be constructed of bronze or other materials depending upon design requirements. Being press-fit into place, it is obvious that the throttle bushing 39 will remain stationary with respect to the frame. In configuration the throttle bushing 39 is generally ring shaped having a main inner bore 39b, a second slightly smaller diameter bore 39c and a final yet smaller diameter bore 39d. The smaller diameter bores 39c and 39d are generally positioned in the area of the portion 39a and provide a retaining lip for a stationary seat or seal member 41.

Positioned between the sealing member 41 and a rearward portion 30c of the impeller 30 is a rotating assembly of spacer-sealing members 42, 43, 44 and 45 which, together with the stationary seat or sealing member 41 and the inside bore 39b of the throttle bushing 39 form a shaft seal cavity area 49 which is in fluid communication with the impeller cavity 17 through a communicating film-thin passageway 50.

The seat 41 may have a retaining member 41a seated in a groove about the outer peripheral surface thereof. Thus, the seal member 41 is stationary while the members 42, 43 and 44 rotate thereagainst. These members 42, 43 and 44 are driven by the shaft 34 and seal along the shaft 34. The faces of seat 41 and rotating member 42 rub together and effectively seal or retain the fluid in the seal cavity 49. The washer-spacer 45 may advantageously be cup-shaped and have a forwardly extending portion 45a surrounding the rearward portion 30c of the impeller 30. The film-thin passageway 50 is defined by the bore 39b and the outer periphery of the portion 45a of the washer-spacer 45. The passageway 50 is of such a dimension as to permit only a filmlike thickness of fluid to flow between the impeller cavity 17 and the shaft seal cavity 49. Thus, although there is a great flow of fluid through the pump and particularly the impeller shaft cavity 17, the flow to and from the shaft seal area 49 is a very small percentage of the total flow through the pump.

From the above description of the pump construction it will be understood that a very small portion of the fluid being pumped through the impeller cavity 17 is allowed to pass through the passageway 50 into a seal cavity area 49. The exact size of the passageway 50 will depend upon the properties such as density, viscosity, etc., of the fluid being pumped and in this respect it is an important feature of our invention that the washer spacer 45 which defines this passageway may be easily and quickly changed to vary the size and consequently the fluid flow volume of the passageway 50. Fluidly isolated from the cavities 17 and 49 and the passageway 50 is the cooling fluid cavity 52. Thus, it is possible and very convenient to have different fluids flowing through these fluidly separated passageways.

Because of the separate flow paths for pumped fluid and for cooling or heating fluid it is possible for example to pump fluids having temperatures in the range of 700° F. or more with a fluid seal construction which need be designated only for the 100° to 200° F. temperature range. The differences in the seal construction are much greater than the differences in temperature would suggest and thus as set forth in the description of the prior art the only effective seal for the high temperatures was an expensive seal, such as a metal bellows type seal. Compounding this high temperature seal construction problem were the high temperature limitations of heat transfer fluids. Thus, the heat transfer fluids were subject to breakdown under the high temperatures and high impeller operating speeds and in addition there was the possibility that the cooling fluids could mix with the fluid being pumped. These prior art seals also were very complex and required a high degree of skilled manpower in their construction and maintenance. Under the greatly reduced seal cavity temperatures according to the present invention conventional, simple and very inexpensive seals may be used. Moreover, the heat transfer fluid breakdown problem is also solved.

According to the present invention a relatively very large cooling fluid cavity 52 is provided in a position extending over a substantial portion of the passageway 50 and substantially over the entire seal cavity area 49 so that the very small amount of pumped fluid that is allowed to flow into and out of the sealed cavity area 49 may be greatly reduced in temperature by even a moderate amount of cooler fluid flowing through the cooling cavity 52. Another advantage of the construction according to the present invention is that the degree of cooling and the temperature of the fluid in the seal cavity may be closely controlled by varying the rate of flow and the specific heat of the fluid flowing through the cooling passage 52. Also, of course, the amount of fluid being cooled, i.e. the amount of fluid flowing through the passageway 50 may be easily regulated and kept to an absolute minimum. Since the pressures of the fluid in the impeller cavity and in the seal cavity will be equal and since the seal cavity is in the nature of a dead end area the inclination of the fluid to flow into and out of the seal cavity 49 through the passageway 50 will be slight. Thus, the amount of fluid flowing through the passageway 50 may be reduced to the point where it is just sufficient to meet any requirements of lubrication or volume change. The great difference between the volume of fluid being pumped and the volume of fluid being cooled in the area of the seal cavity 49 assures that the temperature of the fluid being pumped will not be changed to any noticeable degree.

In a typical example of operation where hot oil of a temperature of 500° to 700° or more is being pumped and the cooling means is a cold tap water at a temperature of 40° to 50° the oil will enter through an inlet passageway 15 and be propelled by the impeller 30 through the impeller cavity area 17 out through a pressure outlet 28 not shown but as will be understood by those skilled in the art. A very small percentage of the fluid in the impeller cavity 17 will circulate through the communicating passageway 50 and into the shaft seal cavity 49 where the seal is provided. As the hot oil fluid passes through the passageway 50 and while it remains in the seal cavity 49 it contacts the throttle bushing 39 which has been cooled by the cooled water flowing through the fluid cavity 52 so that it may be cooled to a much lower temperature.

It is an important feature of the present invention that the cooling cavity 52 extends not only over the communicating passageway 50 but also surrounds the seal cavity 49 and thus serves to maintain the relatively stagnant fluid in the cavity 49 at a reduced temperature.

From the above it may be seen that a further advantage of our construction is that a very inexpensive substance such as tap water may be used for cooling and since this fluid does not come in contact with the fluid being pumped it may contain impurities without fear of contamination. Thus, operating expenses are greatly reduced over the prior art structures.

In the example above the cooling water should be piped into the cavity 52 upwardly through the lower pipe connection 54 and be allowed to flow through the cavity 52 and out through the upper outlet 55 to a drain. Allowing the used cooling fluid to flow to an atmospheric outlet will insure that the water pressure in the cooling cavity will be and stay as low as possible. It should be understood that this is by way of example only and that the cooling fluid may indeed be under pressure.

A frame cavity 60 bounded by the external frame casting 11 and the internal shaft support portion 12 will of course receive any possible leakage of fluid past the shaft seal means 41 through 44. Accordingly, an appropriate drain means may be provided as will be understood by those skilled in the art. Also, a suitable mount 65 having connector means 66 and 67 affecting attachment thereof with the external frame 11 may be provided as one alternative mounting means for the pump and driving means.

In summary the following advantages over the prior art are readily apparent. Of foremost importance when considering the extreme temperatures under which this pump has been designed to operate is the fact that the construction has been extremely simplified. Specifically an expensive jacketing arrangement has been eliminated. Incorporating the cooling fluid cavities in the separate throttle bushing allows the use of a standard pump frame for designs of different cooling capacities and shaft size. Thus, if it is desired for design purposes to vary the cooling cavity size an standard size pump frame may be used with merely the throttle bushing being changed. Likewise, where a different shaft size is required, a mere change in the throttle bushing or seal members 41–45 can readily accommodate it. The ready detachability of the casing 13 furthermore allows change of the impeller size and configuration as well as a change in the size of the inlet passageway 15. For designs which require no cooling the same standard pump frame may still be used by simply inserting a throttle bushing with no cavity therein. This design flexibility as well as the great ease of assembly and disassembly by even those of minimum skills, facilitates maintenance and construction. Field service repair time and the accompanying downtime are at an absolute minimum.

Restricting the fluid flowing from the impeller cavity chamber to the shaft seal chamber to a filmlike layer which is directly adjacent to the cooling portion, results in extremely effective cooling. The seal cavity area may be kept as low as 100° F. to 200° F. with fluid of 700° or more being circulated in the pumping chamber. Further, a wide temperature range of operation can be accommodated by this unit due to the extremely efficient nature of the design. The cooler temperatures in the area of the shaft seal permit the use of standard face type seals rather than the heretofore used expensive, exotic shaft seals.

Separation of the cooling area from the hot pumped fluid area permits use of cooling fluids that do not have to be cleaned, treated or free of contaminants since there is no direct contact between the pumped fluid and the cooling liquids. The versatility permitted by the ready interchangeability of the various pump members permits pumping hot oil, hot water and many other fluids with minor modifications of the basic pump unit. The high temperatures of the fluid being pumped are not transmitted along the shaft to the motor bearings and windings, because the cooling fluid through the cooling jacket cavity serves to dissipate the heat normally transmitted along the shaft. Therefore, standard motors having standard bearing grease and conventional wire insulation can be used. The advantages associated with standardization and the elimination of special pumps are thus clearly made possible by our invention.

In addition to the above advantages of our invention, it may be seen that the large cooling cavity area extending from a point over the passageway 50 over the entire seal cavity 49 assures lowest temperatures in the cavity 49. Increasing the diameter of the throttle bushing 39 also increases its relative cooling surfaces and in addition allows the sealing cavity to be directly interposed between the cooling means and the seal members. This compact design allows the impeller to be located very close to the motor, which reduces the bearing load and increases bearing life.

Although minor modifications might be suggested by those versed in the art, it should be understood that we wish to embody within the scope of the patent warranted hereon all such modifications as reasonably and properly come within the scope of our contribution to the art.

We claim:

1. A high temperature pump comprising a pump frame means, a driving shaft means, said shaft means being mounted for rotation in said frame means, an impeller attached to said shaft means to rotate therewith, means defining an impeller cavity area adapted to receive a first pumped fluid therein and therethrough, said impeller being located in said impeller cavity area, a driving shaft seal means located about said shaft means at a point spaced from said impeller cavity area, a shaft seal cavity area within said frame means and generally extending around said shaft seal means, means defining an axial extending fluid passage connecting said impeller cavity area and said shaft seal cavity area so that a portion of said first fluid may flow from said impeller cavity area into and out of said shaft seal cavity area, said means including a fluid jacket located within said frame and generally extending around said communicating passage and said shaft seal cavity, said fluid jacket having means to carry a second fluid therein and therethrough whereby the temperature of the first fluid in said seal cavity area may be greatly influenced by the temperature of said second fluid in said fluid jacket.

2. A high temperature pump according to claim 1 wherein said communicating passage is of a film-thin cross section and is adjacent to and in heat transfer relationship with said fluid jacket whereby said film-thin cross section permits only the very small percentage of said first fluid to reach said seal cavity area and thereby allows this small amount of fluid to be greatly changed in temperature.

3. A high temperature pump according to claim 1 wherein said frame means includes a bore therein substantially coaxial with said shaft means, said fluid jacket having a ring configuration with a channel shaped recess in its outer surface, said outer surface of said fluid jacket conforming to said bore in said frame means, said fluid jacket being press-fit in said bore whereby said recess in said fluid jacket forms a fluid tight passageway, said fluid tight passageway having an inlet and outlet means thereto whereby said second fluid may be circulated therethrough.

4. A high temperature pump according to claim 1 wherein said fluid jacket has an interior cylindrical bore and said seal means includes a washer-spacer of a cylindrical configuration substantially closing said bore but spaced from said bore about its periphery, said space between said washer-spacer and said bore constituting said communicating passageway from said impeller cavity to said seal means cavity.

5. A high temperature pump according to claim 1 wherein said pump frame means includes an external casting, an internal shaft support portion and a separable front cover plate or casing portion, said front cover plate substantially surrounding said impeller and forming a substantial portion of the boundary of said impeller cavity, said impeller being detachably mounted at the end of said shaft whereby maintenance and repair of said impeller and shaft seal construction may be readily affected by the simple detachment of said front cover plate portion and said impeller.

6. A high temperature pump according to claim 1 wherein a driving means is connected to the shaft means and includes a shaft bearing means adjacent said compact shaft seal construction whereby minimum impeller overhang is provided thereby insuring long bearing life.

7. A high temperature pump according to claim 1 wherein said fluid jacket includes a retaining lip surrounding said shaft, said shaft sealing means being retained on one end by said retaining lip and being held at said other end under compressive force by an abutment on said impeller at the point of intersection with such shaft.

8. A compact, inexpensive high temperature pump having an impeller cavity adapted to contain high temperature fluid, a driven impeller in said cavity, a shaft means connected adjacent one end to said impeller and adapted to be rotated by a driving means, a seal means about and in part spaced from said shaft, said seal means including a cooling jacket and forming a seal cavity bounding the outside thereof, and a sealing means on the inside to define a film-thin passageway from said impeller cavity to said seal cavity whereby fluid from said impeller cavity may pass to and from said seal cavity, said cooling jacket being around the outside of and in heat transfer relationship to said seal cavity and said passageway, said cooling jacket having a second, low temperature fluid passing therethrough whereby said fluid in said passageway and said seal cavity is cooled to a temperature intermediate said high and low temperatures so that said seal means need only withstand said intermediate temperature.

9. A high temperature pump according to claim 8 wherein a washer-spacer surrounds but is spaced from said shaft, said space between said washer-spacer and said shaft forming a film-thin passageway whereby only a very minor percentage of fluid passing through said impeller cavity passes into said seal cavity.

10. A high temperature pump according to claim 8 wherein said seal means includes a seat having a groove in the outer periphery thereof, a retaining member seated in said groove, a rotating assembly of a plurality of spacer-sealing members being driven by said shaft, said seat and rotating spacer-sealing member rubbing together to effectively seal and retain the fluid in the seal cavity.

UNITED STATES PATENT OFFICE
CERTIFICATE OF CORRECTION

Patent No. 3,600,101          Dated August 17, 1971

Inventor(s) Paul L. Oglesby et al

It is certified that error appears in the above-identified patent and that said Letters Patent are hereby corrected as shown below:

Column 3, line 54, change "A" to --As--.

Column 4, line 4, after "cavity" insert --area--;

line 42, change "designated" to --designed--.

Column 7, line 21, after "plate" insert --portion--

Column 8, line 24, delete "a" and insert --said--

Signed and sealed this 29th day of August 1972.

(SEAL)
Attest:

EDWARD M. FLETCHER, JR.
Attesting Officer

ROBERT GOTTSCHALK
Commissioner of Patents